Patented Mar. 10, 1936

2,033,515

UNITED STATES PATENT OFFICE

2,033,515
APOCUPREINE AND APOCUPREINE DERIVATIVES

Leonard H. Cretcher, Courtland L. Butler, and Alice G. Renfrew, Pittsburgh, Pa., assignors to Mellon Institute of Industrial Research, a corporation of Pennsylvania No Drawing. Application November 21, 1934, Serial No. 754,090

9 Claims. (Cl. 260—26)

This invention relates to the preparation of the apocupreines and their separation into purified fractions as definite compounds. Two of these are hereinafter named α and β apocupreine. The crude mixture from which these compounds were separated has been called in the literature apoquinine and also isocupreine (Henry, Plant Alkaloids, P. Blakiston's Son and Co., Philadelphia, 1924, pages 138 and 146) and was considered as a uniform product, isomeric with cupreine. We have discovered, however, that the product called apoquinine is not uniform and have succeeded in fractionating it and deriving from it two definite substances, the apocupreines.

Following is a description of our modification (a modification that preferably we follow) of the known methods of preparation of apoquinine, and also a description of its separation into the two apocupreines.

Preparation of crude apocupreine (apoquinine)

Our procedure, which may be followed in substance by the chemist, was specifically as follows: Solutions containing 24 g. of quinine in 100 cc. of hydrochloric acid of sp. gr. 1.125 are prepared. The solutions are heated in sealed containers at 140°–150° C. for five hours. These conditions represent an increase in the proportion of quinine to acid, and a decrease in the time required for reaction. The previously specified conditions (Hesse, Ann. CCV, 314, 1880; Fränkel and Buhlea, Ber., LVIII, 559, 1925) require 20 parts of quinine to 100 parts of acid and a reaction period of seven hours. The reaction product is diluted with an equal volume of water and the solution made alkaline with a slight excess of 40 per cent. sodium hydroxide solution. It is filtered from any insoluble material and decolorized if necessary with activated charcoal. Crude apocupreine is thrown out of the alkaline solution by neutralizing with $CO_2$ gas, solid $CO_2$, ammonium carbonate, or ammonium chloride solution. It is washed thoroughly and dried.

By way of alternative, and still in preference to the usual methods of preparation, quinine may be converted to crude apocupreine by dissolving it in 60 per cent. sulphuric acid in the proportion of 40 g. of quinine to 200 cc. of acid, and heating the solution for 5–7 hours under a reflux condenser. When the demethylation is complete (as shown by the absence of alkali insoluble material, when a small test of the reaction liquor is treated with sodium hydroxide solution) the crude apocupreine is thrown out of the alkaline solution by use of $CO_2$ gas, solid $CO_2$, ammonium carbonate, or ammonium chloride solution. It is washed thoroughly and dried.

Separation of the apocupreines

Contrary to statements in the literature on the uniformity of apoquinine—that is to say, crude apocupreine—(Jarzynski, Ludwiczakowna and Suszko, Rec. trav. chim., LII, 839, 1933), we have discovered that the crude reaction product made by methods already known or by modifications of these methods described in this application is not a single substance. A process is given below for the separation of the product into purified fractional derivatives.

The crude apocupreine from the hydrochloric acid method of preparation is converted to dihydrochloride in absolute alcoholic solution and fractionally crystallized from a mixture of absolute alcohol and ether. At the start the proportions of solvents should be 500 cc. of 2:1 alcohol-ether mixture to 100 g. mixed dihydrochlorides. As the fractions become purer, the proportion of ether may advantageously be decreased. Two definite fractions of dihydrochloride with constant optical rotation are eventually obtained, a less soluble, impure hydrochloro apocupreine dihydrochloride, having $[\alpha]_D -175°$ to $-176°$ and a more soluble α apocupreine dihydrochloride, having $[\alpha]_D -216°$ to $219°$.

When no further crystalline material can be obtained, the mother liquors are evaporated to dryness, or the residual solid material is thrown out of solution by addition of a large volume of ether. The base is regenerated from this impure dihydrochloride and converted to monohydrochloride. On fractional crystallization α apocupreine monohydrochloride $[\alpha]_D -163°$ is obtained.

A batch of 193 g. of crude apocupreine prepared by the hydrochloric acid method, fractionated in the manner described above, yielded α apocupreine dihydrochloride $[\alpha]_D -216$ to $-219°$ _____ 115 g.
impure hydrochloro apocupreine dihydrochloride $[\alpha]_D -175$ to $-176°$ _____ 24 g.

The first of these salts, on conversion to monohydrochlorides, yields α apocupreine monohydrochloride, $[\alpha]_D -163°$.

A batch of 37 g. crude apocupreine prepared by the sulphuric acid method, fractionated in this manner, yielded α apocupreine dihydrochloride $[\alpha]_D -216°$__ 31 g.

α and β apocupreine may be separated directly from crude mixed apocupreines by conversion to monohydrochlorides and crystallization from alcohol. Following is a description of the process.

Crude apocupreine is dissolved in alcohol and neutralized with the calculated quantity of aqueous or alcoholic HCl to form the monohydrochloride salt. The solution is concentrated to a dry crystalline mass which is removed from the container with the aid of a little alcohol. The salt is ground with a little alcohol, filtered, and washed with a little of the same solvent. It is crystallized from alcohol. The yield from 180 g. of base is 97 g. crystalline α apocupreine monohydrochloride $[\alpha]_D-163°$, which may be converted to dihydrochloride $[\alpha]_D-223°$; 26 g. β apocupreine monohydrochloride $[\alpha]_D-148°$, which may be converted to dihydrochloride $[\alpha]_D-205°$ to $-207°$; and 12 g. of an intermediate monohydrochloride fraction $[\alpha]_D-155°$, giving dihydrochloride $[\alpha]_D-214°$.

The rotations in alcohol and melting points of the bases corresponding to our two salts are given below.

α apocupreine dihydrochloride $[\alpha]_D-223°$; amorphous α apocupreine base $[\alpha]_D-215°$; decomposes at 180° to 190° C.

β apocupreine dihydrochloride $[\alpha]_D-205°$ to $-207°$; amorphous β apocupreine base $[\alpha]_D-196°$ to $-197°$; decomposes at 180° to 190° C.

Our further invention consists in the preparation, not of apocupreine dihydrochlorides alone (or, for convenience of designation, unmodified apocupreine dihydrochlorides), but includes alkylated apocupreine dihydrochlorides, and, specifically, ethyl apocupreine dihydrochloride and hydroxyethylapocupreine dihydrochloride.

Preparation of ethylapocupreine

Crude apocupreine is prepared and separated into two crystalline constant rotating di- or mono-hydrochloride fractions, according to the directions given above. These purified fractions are alkylated (conveniently) with ethyl-p-toluenesulfonate. Or apocupreine dihydrochloride which has been partially purified by one crystallization from a mixture of alcohol and ether is alkylated (conveniently) with ethyl-p-toluenesulfonate. The ethylated base is then purified by crystallization from a mixture of alcohol and ether.

Ethylation of α apocupreine dihydrochloride $[\alpha]_D-223°$ 7.3 parts of this salt are converted to base and alkylated with 4 parts of ethyl-p-toluenesulfonate in an alcoholic solution of 4 parts of 85% potassium hydroxide. 3 parts of ethyl-α apocupreine dihydrochloride $[\alpha]_D-236°$ to $-237°$ are obtained.

Ethylation of α apocupreine monohydrochloride $[\alpha]_D-163°$ 6.7 parts of this salt are converted to base and alkylated with ethyl-p-toluenesulfonate as above. 3.8 parts of ethyl-α apocupreine dihydrochloride $[\alpha]_D-230°$ to $-235°$ are obtained.

Ethylation of partially purified mixed apocupreines 200 g. batches of crude apocupreine are dissolved in 750 cc. of absolute alcohol. Dry HCl gas is passed into the solution until it is acid to methyl orange. Crystallization starts during this operation. Anhydrous ether is added slowly to the mixture with stirring to prevent formation of lumps. After 48 hours in the ice box the crystals of partially purified apocupreine dihydrochloride are filtered off and washed with a mixture of alcohol and ether. The average yield per batch of 200 g. crude apocupreine is 150 g. mixed apocupreine dihydrochlorides, $[\alpha]_D-200°$ to $-215°$.

Batches of 76.6 g. of partially purified apocupreine dihydrochloride, $[\alpha]_D-200°$ to $-208°$, are converted to base and alkylated in alcoholic solutions containing one equivalent of KOH, with ethyl-p-toluenesulfonate, in the usual way. The alkylated product is purified by recrystallization of its dihydrochloride from a mixture of alcohol and ether until a rotation of about $[\alpha]_D-224°$ is obtained.

Mixed ethylapocupreine dihydrochloride fractions which have rotations in the range of $[\alpha]_D-215°$ to $-237°$ have been found to be effective in the treatment of pneumonia.

Preparation of hydroxyethylapocupreine

Apocupreine is prepared by one of the methods described above. Purified or partially purified apocupreine fractions may be used as starting materials. The hydroxyethyl group is introduced (conveniently) by alkylating in the presence of one equivalent of alkali with ethylene chlorohydrin according to the equation—

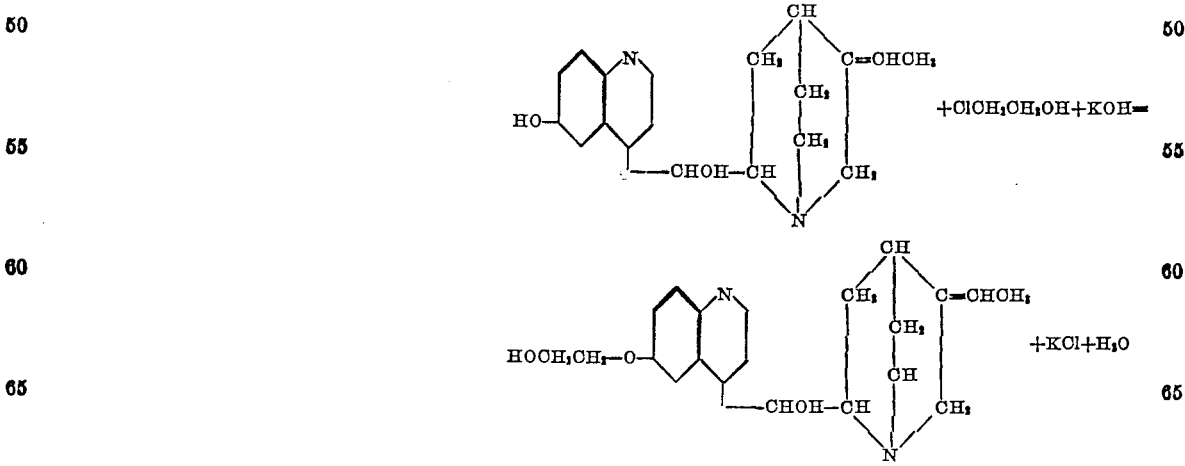

To this end 31 parts of apocupreine from purified apocupreine monohydrochloride of specific rotation $[\alpha]_D-163°$ are dissolved in alcohol containing 6.6 parts of 85% potassium hydroxide. 8 parts of ethylene chlorohydrin are then added and the reaction is allowed to proceed at water bath temperature for 5 hours or at room temperature for 24 hours. The alcohol is then removed in vacuo and the residue taken up in dilute hydrochloric acid. The acid solution is made alkaline under a layer of ether and the desired base is extracted with ether. Unchanged apocupreine is recovered from the alkaline solution on the addition of ammonium carbonate solution. Hydroxyethylapocupreine dihydrochloride is thrown out of the dried ether solution on addition of alcoholic HCl. It is crystallized from a mixture of alcohol and ether. The specific rotation varies from about $[\alpha]_D -183°$ to about $[\alpha]_D -230°$.

We claim as our invention:

1. The method herein described of producing a refined fraction of apocupreine which consists in dissolving crude apocupreine in alcohol, converting the dissolved apocupreine to a hydrochloride, and then effecting crystallization.

2. The method herein described of producing refined fractions of apocupreine which consists in dissolving crude apocupreine in alcohol, converting the dissolved apocupreine to dihydrochloride, and then effecting fractional crystallization of a less soluble low rotating hydrochloro apocupreine dihydrochloride salt and a more soluble high rotating α apocupreine dihydrochloride.

3. The method herein described of producing α apocupreine dihydrochlorides from crude apocupreine which consists in dissolving crude apocupreine in alcohol, converting the dissolved apocupreine to dihydrochloride, effecting fractional crystallization of the less soluble low rotating hydrochloro apocupreine dihydrochloride and the more soluble high rotating α apocupreine dihydrochloride, recovering the residual salt, regenerating the base, converting the regenerated material to monohydrochloride, recrystallizing the monohydrochloride, and converting it into α apocupreine dihydrochloride.

4. The method herein described of producing α and β apocupreine dihydrochlorides from crude apocupreine which consists in dissolving crude apocupreine in alcohol, converting the dissolved apocupreine to monohydrochloride, fractionally crystallizing, and converting to α and β apocupreine dihydrochloride.

5. The method herein described of producing ethylapocupreine which consists in dissolving crude apocupreine in alcohol, converting the dissolved apocupreine to a hydrochloride, effecting fractional crystallization, redissolving the crystallized dihydrochloride fraction in alcohol, converting to base, and alkylating.

6. The method herein described of producing ethylapocupreine which consists in dissolving crude apocupreine in alcohol, converting the dissolved apocupreine to dihydrochloride, effecting fractional crystallization, redissolving the crystallized dihydrochloride fraction in alcohol, converting to base, alkylating, and purifying by recrystallization of the residual dihydrochloride.

7. Purified α apocupreine of specific rotation of about $[\alpha]_D -215°$, and its salts.

8. Purified α apocupreine monohydrochloride of specific rotation of about $[\alpha]_D -163°$ to $-165°$.

9. Puried α apocupreine dihydrochloride of specific rotation of about $[\alpha]_D -218°$ to $-223°$.

LEONARD H. CRETCHER.
COURTLAND L. BUTLER.
ALICE G. RENFREW.